United States Patent
Pielock

(10) Patent No.: US 11,173,764 B2
(45) Date of Patent: Nov. 16, 2021

(54) AIR SUSPENSION STRUT HAVING A SEALED CLOSURE CAP

(71) Applicant: Continental Teves AG & Co. OHG, Frankfurt (DE)

(72) Inventor: Ralf Pielock, Essel (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 44 days.

(21) Appl. No.: 16/735,108

(22) Filed: Jan. 6, 2020

(65) Prior Publication Data

US 2020/0139778 A1    May 7, 2020

Related U.S. Application Data

(63) Continuation of application No. PCT/EP2018/065051, filed on Jun. 7, 2018.

(30) Foreign Application Priority Data

Jul. 7, 2017  (DE) ..................... 10 2017 211 694.3
Mar. 23, 2018  (DE) ..................... 10 2018 204 485.6

(51) Int. Cl.
  *B60G 11/27*  (2006.01)
  *B60G 13/00*  (2006.01)
  *B62D 21/11*  (2006.01)

(52) U.S. Cl.
  CPC ............ *B60G 11/27* (2013.01); *B60G 13/001* (2013.01); *B60G 13/003* (2013.01); *B62D 21/11* (2013.01);
  (Continued)

(58) Field of Classification Search
  CPC . F16F 9/084; F16F 1/3835; F16F 9/54; B60G 2204/41
  See application file for complete search history.

(56) References Cited

U.S. PATENT DOCUMENTS

| 3,749,210 A | * | 7/1973 | DeBaan | ................... F16F 9/084 188/298 |
| 5,628,388 A | * | 5/1997 | Angermann | ......... B60G 15/068 188/321.11 |

(Continued)

FOREIGN PATENT DOCUMENTS

| DE | 10132061 A1 | 1/2003 |
| DE | 10229287 A1 | 1/2004 |

(Continued)

OTHER PUBLICATIONS

Job, Air-Spring Module, Jan. 17, 2013, EPO, WO 2013007527 A1, Machine Translation of Description (Year: 2013).*

(Continued)

*Primary Examiner* — Paul N Dickson
*Assistant Examiner* — Matthew D Lee

(57) ABSTRACT

An air suspension strut for a motor vehicle, comprising an air spring having a shock, wherein the air spring comprises an air spring cover and a rolling piston, wherein a rolling bellows of elastomer material is clamped in an airtight manner between the air spring cover and the rolling piston, wherein the rolling bellows, together with the air spring cover and the rolling piston, delimit a working chamber filled with compressed air, wherein the shock damper is supported via a damper bearing arranged on a piston rod in a pot-shaped bearing holder of the air spring cover. The closure cap seal comprises an inner sleeve and a closure part radially enclosing the inner sleeve, wherein the inner sleeve is pushed onto an end section of the piston rod, and the closure part is pushed sealingly into the bearing holder.

11 Claims, 2 Drawing Sheets

(52) U.S. Cl.
CPC .. *B60G 2202/152* (2013.01); *B60G 2204/128* (2013.01); *B60G 2204/41* (2013.01)

(56) References Cited

U.S. PATENT DOCUMENTS

| | | | |
|---|---|---|---|
| 2002/0144869 A1* | 10/2002 | Pape | F16F 9/54 188/266 |
| 2004/0017030 A1 | 1/2004 | Dehlwes et al. | |
| 2004/0017035 A1 | 1/2004 | Treder et al. | |
| 2008/0012263 A1* | 1/2008 | Dickson | B60G 13/003 280/124.155 |
| 2012/0049428 A1 | 3/2012 | Moore et al. | |
| 2016/0116016 A1 | 4/2016 | Hermann et al. | |
| 2016/0369839 A1 | 12/2016 | Kondor et al. | |
| 2018/0163811 A1 | 6/2018 | Lee | |
| 2019/0186585 A1* | 6/2019 | Akiyama | B60G 13/003 |

FOREIGN PATENT DOCUMENTS

| | | | | |
|---|---|---|---|---|
| DE | 102007027834 A1 | | 12/2008 | |
| DE | 102011081696 A1 | | 3/2012 | |
| DE | 102012012902 A1 | | 1/2013 | |
| DE | 102012210388 A1 | | 1/2013 | |
| DE | 102011056518 A1 | | 6/2013 | |
| DE | 102014016004 A1 | | 4/2016 | |
| DE | 102015007743 B4 | | 2/2018 | |
| DE | 202017006372 U1 | | 2/2018 | |
| EP | 0080267 A1 | * | 6/1983 | F16F 9/084 |
| EP | 2314469 B1 | * | 12/2012 | B60G 13/003 |
| JP | 2019018750 A | * | 2/2019 | F16F 9/54 |
| WO | WO-0214095 A1 | * | 2/2002 | F16F 13/16 |
| WO | 02/50450 A1 | | 6/2002 | |
| WO | 2004/097245 A1 | | 11/2004 | |
| WO | WO-2004097245 A1 | * | 11/2004 | F16F 1/3835 |
| WO | WO-2013007527 A1 | * | 1/2013 | F16J 3/06 |
| WO | WO-2016022424 A1 | * | 2/2016 | F16F 9/54 |

OTHER PUBLICATIONS

Steen, Hinge Device Provided With a Two-Piece Compound, Nov. 11, 2004, EPO, WO 2004097245 A1, Machine Translation of Description (Year: 2004).*

Merkel, Bearing for the Free End of a Support Strut Element, Dec. 19, 2012, EPO, EP 2314469 B1, Machine Translation of Description (Year: 2012).*

Merkel, Bearing for the Free End of a Support Strut Element, Dec. 19, 2012, EPO, EP 2314469 B1, Machine Translation of Claims (Year: 2012).*

Search Report dated Nov. 20, 2018 from corresponding German Patent Application No. DE 10 2018 204 485.6.

International Search Report and Written Opinion dated Oct. 9, 2018 from corresponding International Patent Application No. PCT/EP2018/065051.

* cited by examiner

AIR SUSPENSION STRUT HAVING A SEALED CLOSURE CAP

CROSS REFERENCE TO RELATED APPLICATIONS

This application is the U.S. national phase application of PCT International Application No. PCT/EP2018/065051, filed Jun. 7, 2018, which claims priority to German Patent Application Nos. DE 10 2017 211 694.3, filed Jul. 7, 2017, and DE 10 2018 204 485.6, filed Mar. 23, 2018, wherein the contents of such applications are incorporated herein by reference.

TECHNICAL FIELD

An air suspension strut having a sealed closure cap.

TECHNICAL BACKGROUND

An air suspension strut, as known for example from DE 10 2012 012 902 A1, is arranged between the motor vehicle chassis or a wheel carrier and the motor vehicle body. In general, the air suspension strut comprises an air spring and a shock damper. Here, the air spring performs the function of cushioning the wheel, while the shock damper damps the oscillations of the wheel and of the motor vehicle body.

The air spring substantially consists of an air spring cover, a rolling piston and a rolling bellows clamped therebetween in an airtight manner, thereby delimiting a working chamber under air pressure. The rolling bellows is enclosed by a sleeve-shaped outer guide and, during spring compression, rolls on the concentric rolling piston with the formation of a rolling fold. By way of the air spring cover, the air suspension strut is connected to the motor vehicle body by means of appropriate fastening means.

The shock damper arranged within the air spring is connected on the one hand to the wheel carrier and is supportively fastened on the other hand via a damper bearing in the air spring cover by way of its piston rod, which can dip into the damper tube. In general, the damper bearing comprises a support disk, which is secured on the piston rod by means of a nut, wherein the support disk is inserted in or surrounded by an elastomer. The elastomer, in turn, is inserted into the bearing holder formed in the core region of the air spring cover, and the damper bearing is closed at the top by a closure cap pressed onto the air spring cover.

To ensure that no compressed air escapes from the working chamber of the air spring into the atmosphere along the piston rod via the damper bearing, a seal must be provided on the piston rod. This is very complex in terms of design, especially with electronically controlled shock dampers, since the control line thereof, which is situated in the piston rod, must be routed to the outside.

Seals are generally provided on the piston rod below the damper bearing. Thus, DE 101 32 061 A1, for example, discloses the practice of securing an elastomer rolling diaphragm, preferably with embedded strengthening members, by one of its ends on the piston rod and by the other end on the base of the bearing holder by means of holding and contact pressure parts.

Another possibility is known from DE 10 2012 210 388 A1, wherein a seal element comprising an inner ring, an outer ring and a rubber element is provided, wherein the rubber element is provided radially between the inner ring and the outer ring. The inner ring rests on the piston rod and the outer ring rests on the base of the bearing holder and is furthermore enclosed laterally, wherein further seal rings are provided at respective contact points in order likewise to seal off the piston rod below the damper bearing.

However, both designs have the disadvantage of the high assembly effort and the increased overall length of the air suspension strut.

In the case of the already cited DE 10 2012 012 902 A1, the seal is provided at the same axial installation height with the damper bearing, or the seal is combined with the damper bearing. However, the disadvantage is that tuning of the damper bearing to the tensile and compressive forces, which differ according to requirements, is excluded or made more difficult.

The proposal according to DE 10 2011 056 518 A1 is to use a rolling bellows on the closure cap to seal the damper bearing. This cap is secured at its outer end on the closure cap and at its inner end on a sleeve, which is mounted on the tapered piston rod and is secured by a nut. In practical implementation, the rolling bellows, which is likewise reinforced with strengthening members and is preferably vulcanized on, has the disadvantage that enduring pressure tightness at the attachment points of the ends of the rolling bellows can be maintained only with difficulty in the long-term. Particularly due to the axial movement of the piston rod and the rolling movement of the rolling bellows, the vulcanized-on attachment points are subject to particular stress.

What is needed is to make available an air suspension strut which has an improved damper bearing seal, avoids the disadvantages cited and allows a more compact construction.

DETAILED DESCRIPTION

Figure 1:
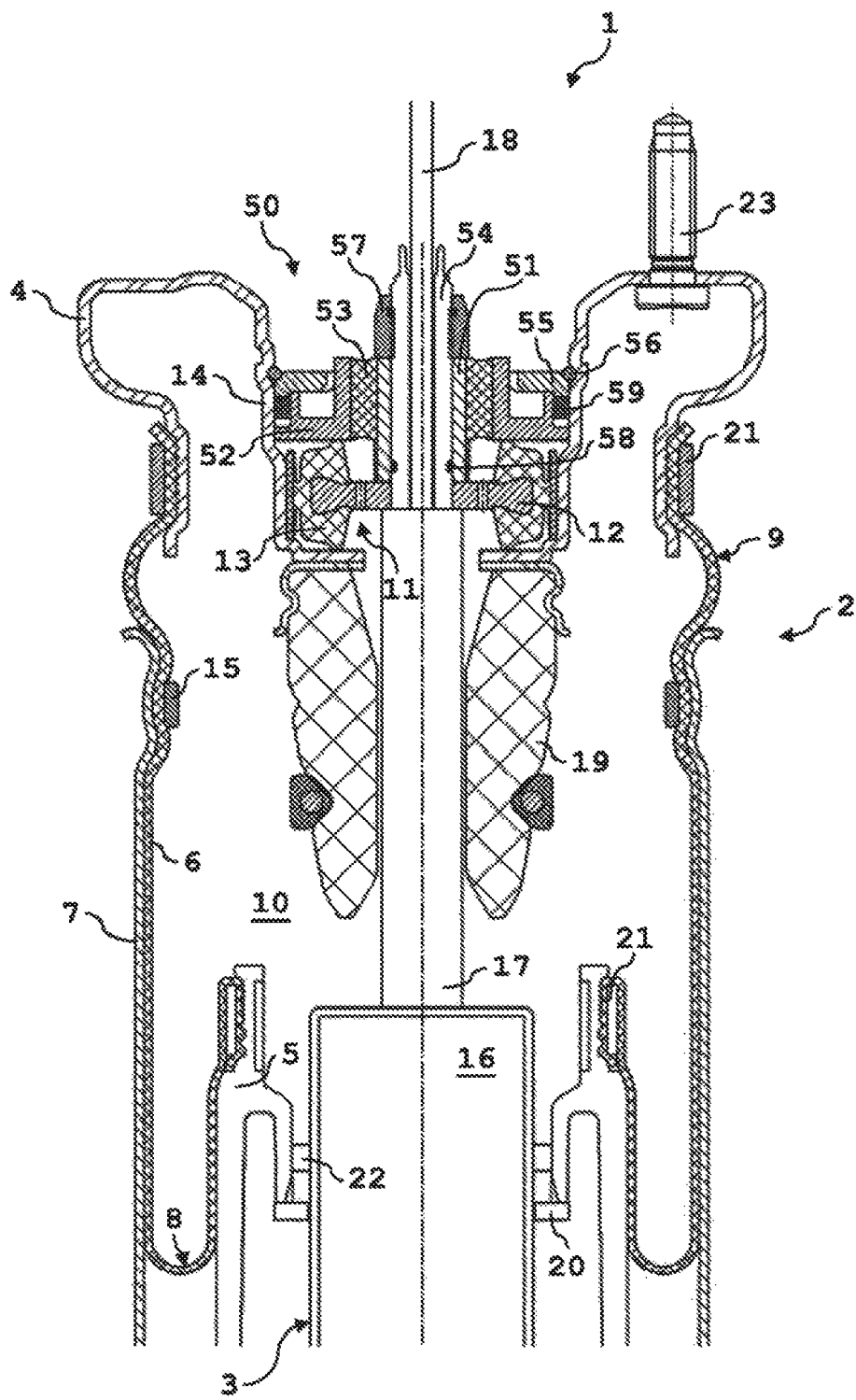
FIG. 1 shows a first exemplary embodiment of an illustrative air suspension strut.

An air suspension strut for a motor vehicle is made available, comprising an air spring having a shock damper for cushioning and damping vibrations of a motor vehicle chassis, wherein the air spring comprises an air spring cover and a rolling piston, wherein a rolling bellows of elastomer material is clamped in an airtight manner between the air spring cover and the rolling piston, wherein the rolling bellows, together with the air spring cover and the rolling piston, delimit a working chamber filled with compressed air, wherein the shock damper is supported via a damper bearing arranged on a piston rod in a pot-shaped bearing holder of the air spring cover, wherein the bearing holder is pressure-tightly closed above the damper bearing by a closure cap seal, wherein the closure cap seal comprises an inner sleeve and a closure part radially enclosing the inner sleeve, wherein the inner sleeve is pushed onto an end section of the piston rod, and the closure part is pushed sealingly into the bearing holder, and wherein a rubber strip is provided between the inner sleeve and the closure part.

By means of the closure cap seal designed with a rubber strip, an easily installed and compact seal is made available above the damper bearing. The rubber strip can advantageously be subject to shear stress and has an adequate axial travel. At the same time, the rubber strip allows cardanic deflection, but the pressure tightness requirements on the seal are nevertheless met.

The rubber strip is formed from a solid material or a solid profile. That is to say that the rubber strip is a ring made of rubber and has a round profile in cross section.

In one or more embodiments, the minimum thickness of the rubber strip is 5 mm, or 10 mm. That is to say that, radially outward (closure part) from the center (inner sleeve), the rubber strip has a certain thickness. Inside diameters from about 16 mm to outside diameters of about 40 mm can be chosen for the rubber strip ring. The thick rubber strip has the advantage that it is inexpensive and can be installed easily.

In one or more embodiments, the rubber strip is vulcanized together with the inner sleeve and the closure part over its respective contact surface. As compared with the prior art, the rubber strip can therefore be connected more easily and more reliably to the inner sleeve and to the closure part and has longer durability or pressure tightness.

In one or more embodiments, the rubber strip has a metal insert. The metal insert, which is inserted axially lengthways and centrally in the rubber strip, serves to influence the characteristic curve of the rubber strip. The rubber strip is optionally divided by the metal insert into an inner and an outer strip, wherein the inner strip comprises a different rubber blend from the outer strip. Different shear components can thus be chosen for the rubber strip.

In one or more embodiments, the metal insert is embedded fully in the rubber strip, thereby making it possible to extend the life of the rubber strip.

In one or more embodiments, the rubber strip is reinforced with a woven fabric. The rubber strip reinforced with woven fabric has an increased temperature stability and pressure resistance.

In one or more embodiments, the inner sleeve rests axially on a supporting piece of the damper bearing. By virtue of the fact that the inner sleeve is secured at the top by a nut, an advantageous force configuration or force flow via the supporting piece into the piston rod can be achieved.

In one or more embodiments, the inner sleeve rests sealingly on the tapered end region of the piston rod via a sleeve seal.

The closure part rests sealingly on the inner wall of the bearing holder via a closure part seal.

The air suspension strut is used in a chassis, such as in an air spring system, for a motor vehicle.

FIG. 1 shows an air suspension strut 1 having the components, namely air spring 2 and shock damper 3, wherein the air spring 2 comprises an air spring cover 4, a rolling piston 5 and a rolling bellows 6 with an outer guide 7 which encloses it in the form of a sleeve. The shock damper 3 is provided within the air spring 2, the shock damper 3 comprising a damper tube 16, a piston rod 17 which can dip into the latter and has an integrated control line 18, and a damper bearing 11.

The air suspension strut 1 satisfies two functional areas: on the one hand, the air spring 2 satisfies the generation of carrying force, whereas the shock damper 3 is responsible for linear guidance. Fastening means 23 on the air spring cover 4 make it possible for the air suspension strut 1 to be fastened on the one hand to a motor vehicle body and on the other hand, via a shock damper eye, to a wheel carrier of the motor vehicle chassis, with the result that the motor vehicle is spring-cushioned and damped.

This regular installed position of an air suspension strut determines the "up/down" orientation.

The rolling bellows 6 is made from elastomer material, the rolling bellows 6 delimiting, with the air spring cover 4 and rolling piston 5, an airtight, volume-elastic working chamber 10 which can be filled with compressed air. The hose-shaped rolling bellows 6 is fastened by its first end to the air spring cover 4 and by its second end to the rolling piston 5, e.g. via clamping rings 21 at the connection regions of these air spring attachment parts.

In the case of relative movements along the longitudinal axis of the air suspension strut 1 between the air spring cover 4 and rolling piston 5, the rolling bellows 6 rolls on the concentric rolling surface of the rolling piston 5 with the formation of a rolling fold 8. Furthermore, the rolling bellows 6 forms a cardanic fold 9 on the air spring cover 4 that acts as a cardanic bearing. At the same time, the rolling bellows 6 is provided with embedded strength members.

Particularly in the case of the comfortable axial bellows, that is to say with strength members oriented in the axial direction, use is made of outer guides 7 to limit the lateral extension of the rolling bellows 6. Here, the outer guide 7 is clamped against the rolling bellows 6 by an inner locking ring 15 provided in the working chamber 10.

In order to protect the rolling fold 8 from contamination, it is possible to provide a corrugated bellows which is fastened, for example, to the wheel-carrier-side end region of the outer guide 7 and to the damper tube 16.

An additional spring 19 is arranged bearing against the lower side of the air spring cover 4 and facing toward the shock damper 3. The additional spring 19 has a through-bore for the piston rod 17 and therefore encloses the latter. During spring compression, the end side of the damper tube 16 moves toward the air spring cover 4, and therefore the additional spring 19 serves as a travel limiter and damps possible forces acting on the air spring cover 4.

The damper tube 16 of the shock damper 3 is provided within the rolling piston 5 or is surrounded by the hollow cylindrical rolling piston 5 at least in certain regions, wherein the rolling piston 5 is fastened standing on the damper tube 16 via a support ring 20. In addition, a sealing system 22 is provided on the support ring 20, said system comprising elastomer sealing rings for example, in order to seal off the working chamber 10 of the air spring 2, which working chamber 10 is expandable within the rolling piston 5. It is additionally known to produce the rolling piston 5 from a light metal, such as aluminum, or a fiber-reinforced plastic.

Shock damper 3 is provided with axially and cardanically movable support by damper bearing 11 in the core region of the air spring cover 4. For this purpose, the air spring cover 4 forms a pot-shaped bearing holder 14, into which the damper bearing 11 is inserted. The air spring cover 4 can be manufactured from steel, aluminum or even from a plastic. Moreover, a through hole for piston rod 17 is provided in the bearing holder 14 on the pot bottom side. The damper bearing 11, which is mounted centrally in the bearing holder 14, is designed to absorb tensile and compressive forces of the shock damper 3. For this purpose, it comprises a supporting disk 12 and an annular damping elastomer 13. The supporting disk 12 is embedded in a groove in the damping elastomer 13 or partially surrounded by the material thereof. In this context, the damping elastomer 13 can be composed of an elastomer or a polyurethane.

The piston rod 17 has a tapered end section 54, wherein an annular stop is formed against which the supporting disk 12 rests. In contrast, the damping elastomer 13 rests on the inside of the base plate of the bearing holder 14 in the axial direction and against or on the inner wall of the bearing holder 14 in the radial direction. Moreover, the supporting disk 12 has a plurality of ventilation holes, which ensure pressure equalization with the damper bearing chamber situated above the supporting disk 12.

In order to seal off the damper bearing 11 from the atmosphere and to prevent leakage along the piston rod 17, a closure cap seal 50 arranged above the damper bearing 11 is proposed. The illustrative closure cap seal 50 comprises an inner sleeve 51, a closure part 52 and a rubber strip 53 made of solid material. The inner sleeve 51 rests sealingly, by means of a sleeve seal 58, against the tapered end section 54 of the piston rod 17. In this arrangement, the inner sleeve 51 is mounted on the supporting disk 12. The inner sleeve 51 is composed of steel, aluminum or even of a plastic. The closure part 52 is arranged in such a way as to surround the inner sleeve 51 radially. Via a closure part seal 59, the closure part 52 rests sealingly against the inner wall of the bearing holder 14. The closure part 52 is composed of a formed steel, aluminum or even of a plastic. The sleeve seal 58 and/or the closure part seal 59 can be implemented by means of a sealing ring or, alternatively, by means of a wide rubber strip.

By means of a metal disk 55 resting axially on the closure part 52, together with a snap ring 56, the closure part 52 is secured axially on the bearing holder 14. Here, the metal disk 55 forms a projection in the circumferential direction, which additionally encloses the closure part 52 radially from the outside. A kind of bayonet joint is also conceivable. In this arrangement, the air spring internal pressure and the axial forces of the damper bearing 11 act on the closure cap seal 50.

By way of example, a rubber strip 53 made from an elastomer solid material is provided radially between the inner sleeve 51 and the closure part 52. The rubber strip 53, which acts as a shear bearing, allows a sufficient axial travel of the piston rod 17 and, at the same time, radial or cardanic deflection. Associated with this is a simplification of assembly and a reduction in the overall length of the air suspension strut 1.

The rubber strip 53 is vulcanized on by means of its respective contact surface with the inner sleeve 51 and the closure part 52 in order to ensure adequate leaktightness. As compared with the prior art, the rubber strip offers wide-area contact surfaces, which is advantageous for attachment by vulcanization with a longer life.

In order to secure the closure cap seal 50, a nut 57 is screwed on the tapered end section 54 of the piston rod 17. This secures the inner sleeve 51, in particular, on supporting disk 12. Particularly in the mode of operation with the damper bearing 11, the illustrative closure cap seal 50 forms a compact design. Thus, the inner sleeve 51 projects partially into the inner region of the damping elastomer 13, while the inner sleeve 51 is supported on the supporting disk 12. The nut 57, which secures from above, forms a nonpositive connection to the piston rod 17.

The closure cap seal 50 situated above the damper bearing 11 furthermore has the advantage that the main flow of force between the additional spring 19 and the attachment to the body is not weakened since, in contrast to the prior art, the seal is arranged away from the base plate of the bearing holder 14. At the same time, the possibility of tuning the damper bearing 13 separately is retained.

Figure 2:
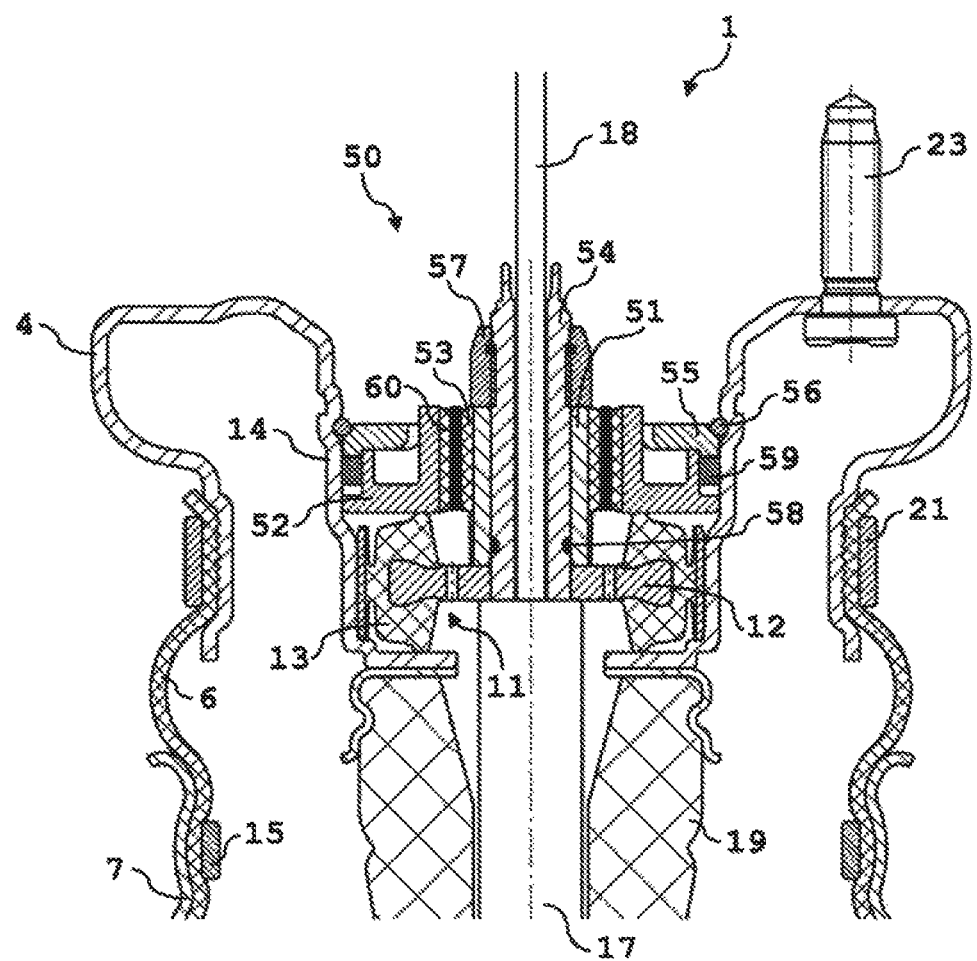
FIG. 2 shows a second exemplary embodiment of an illustrative air suspension strut.

FIG. 2 shows a detail of a second exemplary embodiment of an air suspension strut 1, wherein here, in contrast to the first exemplary embodiment in FIG. 1, an additional metal insert 60 is provided in the rubber strip 53. The metal insert 60 is inserted axially lengthways and centrally in the rubber strip 53, thereby dividing the latter into two strips. According to the example, it is possible here for the inner strip to comprise a different rubber blend from the outer strip. This has the advantage that the shear component of both strips can be modified or adapted to influence the characteristic curve. Moreover, an axial travel limiter for the metal insert 60 can be provided in order to influence the center of rotation and increase the service life.

As an alternative, it is also possible for the metal insert 60 to be fully embedded in the rubber strip 53. This increases the service life of the rubber strip and improves the characteristic curve tuning of the rubber strip 53.

In a further modification, it is also possible for the rubber strip 53 to be reinforced with a woven fabric, thereby increasing the temperature stability and pressure resistance thereof.

The above description is intended to be illustrative, and not restrictive. Many other embodiments will be apparent to those of skill in the art upon reading and understanding the above description. Embodiments discussed in different portions of the description or referred to in different drawings can be combined to form additional embodiments of the present application. The scope should, therefore, be determined with reference to the appended claims, along with the full scope of equivalents to which such claims are entitled.

LIST OF REFERENCE SIGNS

1 Air suspension strut
2 Air spring
3 Shock damper
4 Air spring cover
5 Rolling piston
6 Rolling bellows
7 Outer guide
8 Rolling fold
9 Cardanic fold
10 Working chamber
11 Damper bearing
12 Supporting disk
13 Damping elastomer
14 Bearing socket
15 Inner locking ring
16 Damper tube
17 Piston rod
18 Control line
19 Additional spring
20 Support ring
21 Clamping ring
22 Sealing system
23 Fastening means
50 Closure cap seal
51 Inner sleeve
52 Closure part
53 Rubber strip
54 End section of the piston rod
55 Metal disk
56 Snap ring
57 Sealing nut
58 Sleeve seal
59 Closure part seal
60 Metal insert

The invention claimed is:

1. An air suspension strut for a motor vehicle, comprising:
an air spring having a shock damper for cushioning and damping vibrations of a motor vehicle chassies, wherein the air spring comprises:

an air spring cover;
a rolling piston; and
a rolling bellows of elastomer material clamped in an airtight manner between the air spring cover and the rolling piston,
wherein the rolling bellows, together with the air spring cover and the rolling piston, delimit a working chamber filled with compressed air,
wherein the shock damper is supported via a damper bearing arranged on a piston rod and supported by a pot shaped bearing holder of the air spring cover,
wherein the bearing holder is pressure-tightly closed above the damper bearing by a closure cap seal, and
wherein the closure cap seal comprises;
an inner sleeve,
a closure part radially enclosing the inner sleeve, wherein the inner sleeve is pushed onto an end section of the piston rod, and the closure part is pushed sealingly into the bearing holder; and
a rubber strip provided between the inner sleeve and the closure part.

2. The air suspension strut as claimed in claim 1, wherein the rubber strip is formed from a solid material or a solid profile.

3. The air suspension strut as claimed in claim 1, wherein a thickness of the rubber strip is at least 5 mm.

4. The air suspension strut as claimed in claim 1, wherein a thickness of the rubber strip is at least 10 mm.

5. The air suspension strut as claimed in claim 1, wherein the rubber strip is vulcanized together with the inner sleeve and the closure part over its respective contact surface.

6. The air suspension strut as claimed in claim 1, wherein the rubber strip comprises a metal insert.

7. The air suspension strut as claimed in claim 6, wherein the rubber strip is divided by the metal insert into an inner strip and an outer strip, and
wherein rubber blend of the inner strip is different from a rubber blend of the outer strip.

8. The air suspension strut as claimed in claim 6, wherein the metal insert is embedded fully in the rubber strip.

9. The air suspension strut as claimed in claim 1, wherein the rubber strip is reinforced with a woven fabric.

10. The air suspension strut as claimed in claim 1, wherein the inner sleeve rests axially on a supporting piece of the damper bearing.

11. A chassis for a motor vehicle, having an air suspension strut, the air suspension strut having an air spring having a shock damper for cushioning and damping vibrations of a motor vehicle chassis, wherein the air spring comprises;
an air spring cover,
a rolling piston; and
a rolling bellows of elastomer material is clamped in an airtight manner between the air spring cover and the rolling piston,
wherein the rolling bellows, together with the air spring cover and the rolling piston, delimit a working chamber filled with compressed air,
wherein the shock damper is supported via a damper bearing arranged on a piston rod and supported by a pot shaped bearing holder of the air spring cover,
wherein the bearing holder is pressure-tightly closed above the damper bearing by a closure cap seal, and
wherein the closure cap seal comprises;
an inner sleeve;
a closure part radially enclosing the inner sleeve, wherein the inner sleeve is pushed onto an end section of the piston rod, and the closure part is pushed sealingly into the bearing holder; and
a rubber strip provided between the inner sleeve and the closure part.

* * * * *